United States Patent
Ma et al.

(10) Patent No.: US 7,099,672 B2
(45) Date of Patent: Aug. 29, 2006

(54) METHODS AND SYSTEMS FOR IMPROVING UTILIZATION OF TRAFFIC CHANNELS IN A MOBILE COMMUNICATIONS NETWORK

(75) Inventors: Xiaomin Ma, Durham, NC (US); Yun Liu, Raleigh, NC (US); Kishor S. Trivedi, Durham, NC (US)

(73) Assignee: Duke University, Durham, NC (US)

( * ) Notice: Subject to any disclaimer, the term of this patent is extended or adjusted under 35 U.S.C. 154(b) by 387 days.

(21) Appl. No.: 10/068,183

(22) Filed: Feb. 6, 2002

(65) Prior Publication Data
US 2003/0148765 A1   Aug. 7, 2003

(51) Int. Cl.
*H04Q 7/20* (2006.01)

(52) U.S. Cl. .................. 455/450; 455/464; 455/509; 455/436

(58) Field of Classification Search ........ 455/436–443, 455/450, 456.1, 456.2, 464, 509
See application file for complete search history.

(56) References Cited

U.S. PATENT DOCUMENTS 5,937,353 A * 8/1999 Fapojuwo ............... 455/444
6,370,357 B1 * 4/2002 Xiao et al. ............... 455/67.11
2001/0033600 A1 * 10/2001 Yang et al. ............... 375/130
2002/0082017 A1 * 6/2002 Hattori ...................... 455/436

* cited by examiner

*Primary Examiner*—CongVan Tran
(74) *Attorney, Agent, or Firm*—Jenkins, Wilson, Taylor & Hunt, P.A.

(57) ABSTRACT

Methods and systems for improving utilization of traffic channels in a mobile communications network. A method for allocating communication channels is provided for allocating communication channels for handoff in a first base station having a communication link with active mobile stations located in a handoff area of the first base station and a second base station. The method includes constructing a channel convertible set including communication channels for active mobile stations moving in a direction away from the first base station; receiving a handoff request from a requesting mobile station having a communication link with the second base station; and determining whether a free channel is available for the handoff request. Furthermore, the method includes allocating one of the communication channels in the channel convertible set to the handoff request if a free channel is not available for the handoff request.

46 Claims, 12 Drawing Sheets

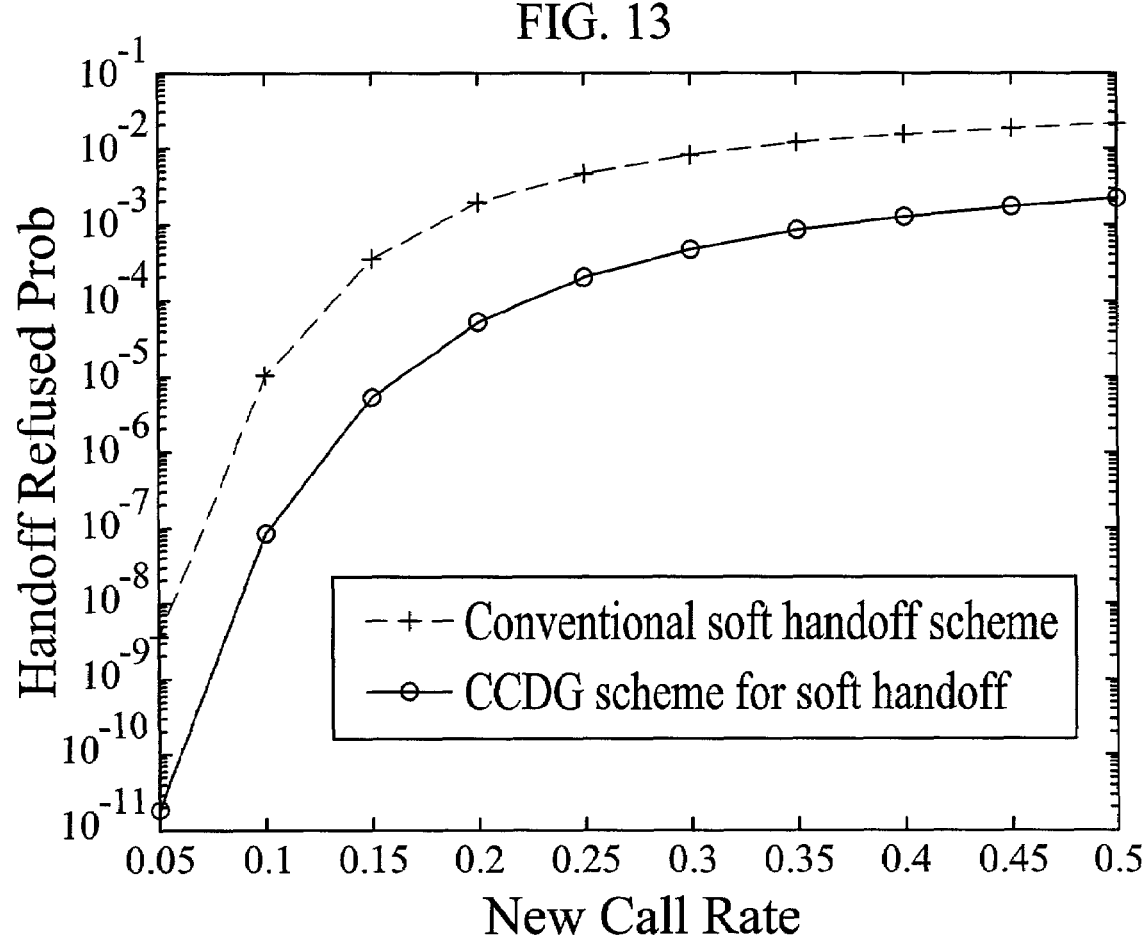

METHODS AND SYSTEMS FOR IMPROVING UTILIZATION OF TRAFFIC CHANNELS IN A MOBILE COMMUNICATIONS NETWORK

TECHNICAL FIELD

The present invention relates to mobile communication systems. More particularly, the present invention relates to allocating communication channels for handoff in a mobile communication system.

BACKGROUND ART

In mobile communication networks, mobile handsets communicate with the fixed network via wireless communication links or channels. The network entity that manages wireless communication channels for a particular geographic area is referred to as a base station. Mobile communication networks typically include many base stations— one for each geographic area or cell.

When a mobile subscriber moves from one location to another location during a call, it may be necessary to hand the call off from one base station to another base station or between antennas within the same base station in order to maintain call quality. Handoff is a process by which a call, or active communication link, is transferred from one communication channel to another. There are three types of handoff that occur in mobile communication systems—hard handoff, soft handoff, and softer handoff. A hard handoff is the transfer of one communication channel to another communication channel that has not been previously established. A soft handoff is a conversion from one communication channel to another previously established communication channel where the two communication channels are with different base stations. A softer handoff refers to a transfer from one communication channel to another previously established communication channel where the two communication channels are with the same base station. A softer handoff may occur when a mobile station moves between areas served by different antennas of a base station.

Although the present invention can be applied to all three types of handoffs, a discussion of soft handoffs illustrates problems common to all three handoff methods. Soft handoff is initiated and ended based on the strength of a pilot signal received by a mobile station. A pilot signal is a signal transmitted from a base station to a mobile station via a control channel. Mobile stations measure the signal strength of the pilot signal to determine whether a handoff is necessary. For example, if the signal strength of a pilot signal from one base station exceeds a threshold value, the base station may determine that handoff of an active communication channel from the current base station to a new base station is required.

The process of soft handoff involves finding an available communication channel on the neighboring base station towards which the mobile station is moving in order to establish an active communication link. The available channels on a base station may be divided into two groups—free channels and soft guard channels. Free channels are communication channels available to mobile stations requesting a communication channel to establish a communication link. Soft guard channels are exclusively reserved for those mobile stations requesting a communication link in the handoff area. The reason for having soft guard channels reserved exclusively for handoffs is to reduce the likelihood of calls being dropped when a mobile station moves from one geographic area to another. In other words, the network designers decided to reserve a portion of base station resources exclusively for handoff calls rather than new calls because they decided it was better to refuse to admit new calls than to drop calls in progress. If a free or soft guard channel is not available on the neighboring base station, the communication link between the mobile station and the communication system may be dropped once the mobile station is out of the coverage area of the base station with which it is actively communicating.

Mobile stations continuously measure pilot signal strength with multiple base stations and classify the base stations in one of three sets based on signal strength: a neighborhood set; a candidate set; and an active set. The neighborhood set contains communication channels that are likely candidates for handoff but not currently in the active set or candidate set. The candidate set contains base stations having at least one available communication channel that could successfully establish a communication link between the base station and mobile station. The active set contains the base stations with which the mobile station has an active communication link on which speech frames or other data frames are transmitted. When the received pilot signal strength exceeds threshold $T_{ADD}$, the detected pilot signal is transferred from the neighborhood set to the candidate set. The threshold $T_{ADD}$ is a predefined pilot signal strength value considered acceptable for establishing a communication link. If a base station receives a message indicating handoff completion from the mobile station, the associated base station is transferred from the candidate set to the active set. If the pilot signal strength received by the mobile station from the base station of the current cell is less than a predefined threshold $T_{DROP}$, the base station is transferred from the active set to the neighborhood set and a message indicating handoff completion is transmitted to the base station.

The coverage area of the overlap of cells in soft handoff is known as the handoff area. The handoff area is primarily controlled by the handoff thresholds, $T_{ADD}$ and $T_{DROP}$. The area of a cell not covered by a handoff area (i.e., does not overlap the geographic area covered by another cell) is known as the normal area. The soft handoff process is defined in the Telecommunications Industry Association (TIA) and Electronic Industries Alliance (EIA) IS-95 publication, "Mobile Station-Base Station Compatibility Standard for Dual-mode Wideband Spread Spectrum Cellular System," which is incorporated herein by reference. In the soft handoff process defined in US IS-95, there can be two or more base stations in the active set. When the signal strength of one of the pilot signals of an active set base station is less than $T_{DROP}$, the corresponding call will leave the handoff area for the normal area after a short duration of time.

Although the capacity of CDMA systems is interference limited in nature, channel shortages may occur and utilization efficiency of traffic channels decreases because mobile stations may use several channels simultaneously when located in the handoff area. For example, while in the handoff area, a mobile station requests a soft handoff to a neighboring base station whenever the received pilot signal strength from the neighbor base station exceeds the predetermined threshold, although the mobile station is not actually approaching the neighboring base station. In this case, there exists unnecessary soft handoff calls requested by a mobile station moving in a direction away from the neighboring base station or a mobile station that is stationary. Typically, in urban CDMA cellular systems, the handoff area occupies approximately 30–50% of the cell area. Therefore, in a handoff process in which mobile stations in the handoff area unnecessarily occupy two or more communication channels, the number of available communication channels is reduced and the probability that a call will be dropped is increased. Therefore, a need exists for an improved communication channel allocation method that discriminates between calls in the handoff area. Furthermore, a process for allocating channels for handoff is desired which does not significantly increase computation complexity.

DISCLOSURE OF THE INVENTION

According to one aspect of the present invention, a method is provided for allocating communication channels for handoff in a first base station having a communication link with active mobile stations located in a handoff area of the first base station and a second base station. The method includes constructing a channel convertible set including communication channels for active mobile stations moving in a direction away from the first base station or stationary; receiving a handoff request from a requesting mobile station having a communication link with the second base station; and determining whether a free channel is available for the handoff request. Furthermore, the method includes allocating one of the communication channels in the channel convertible set to the handoff request if a free channel is not available for the handoff request.

According to another aspect of the present invention, a method is provided for allocating a communication channel of a first base station from a first mobile station located in a handoff area and having an active communication link with the first base station to a second mobile station requesting handoff. The method includes estimating the mobility of the first mobile station with respect to the first base station. Furthermore, the method includes receiving a handoff request from the second mobile station and converting the communication channel from the first mobile station to the second mobile station.

According to yet another aspect of the present invention, a method is provided for estimating the mobility of a mobile station with respect to a first base station. The method includes receiving a signal including an indication of signal strength between the first base station and the mobile station and determining whether the signal strength changes over a period of time. Furthermore, the method includes determining that the mobile station is moving in a direction with respect to the first base station if the signal strength changes over the period time.

According to another aspect of the present invention, a system is provided for allocating communication channels in a mobile communications network. The system includes a mobility estimator, a channel convertible set manager, and a channel allocator. The mobility estimator estimates the relative mobility of mobile stations with respect to a base station. The channel convertible set manager generates a channel convertible set including communication channels for active mobile stations that are determined to be moving away from or stationary with respect to the base station based on mobility estimates generated by the mobility estimator. The channel allocator receives for handoff calls and allocates channels from the channel convertible set for the handoff calls.

Accordingly, it is an object of the present invention to provide allocation of communication channels for mobile stations requesting handoff.

It is another object of the present invention to provide an improved allocation method that discriminates between calls in the handoff area.

Furthermore, it is another object of the present invention to provide a process for allocating channels for handoff which does not significantly increase computing complexity.

Some of the objects of the invention having been stated hereinabove, other objects will become evident as the description proceeds when taken in connection with the accompanying drawings as best described hereinbelow.

BRIEF DESCRIPTION OF THE DRAWINGS

Exemplary embodiments of the invention will now be explained with reference to the accompanying drawings, of which:

FIG. 13 is a graph illustrating the handoff refused probability of the conventional soft handoff scheme as compared to the methods of the present invention.

DETAILED DESCRIPTION OF THE INVENTION

In accordance with the present invention, efficient methods and systems for allocating communication channels for handoff in a mobile communication system are provided. The methods and systems according to the present invention will be explained in the context of flow charts and diagrams. It is understood according to this invention that the flow charts and diagrams can be implemented in hardware, software, or a combination of hardware and software. Thus, the present invention can include computer program products comprising computer-executable instructions embodied in computer-readable media for performing the steps illustrated in each of the flow charts or implementing the machines illustrated in each of the diagrams. In one embodiment of the present invention, the hardware and software for allocating communication channels for handoff is located in a base station. Alternatively, the hardware and software for allocating communication channels for handoff can be located in a mobile switching center (MSC).

Figure 1:
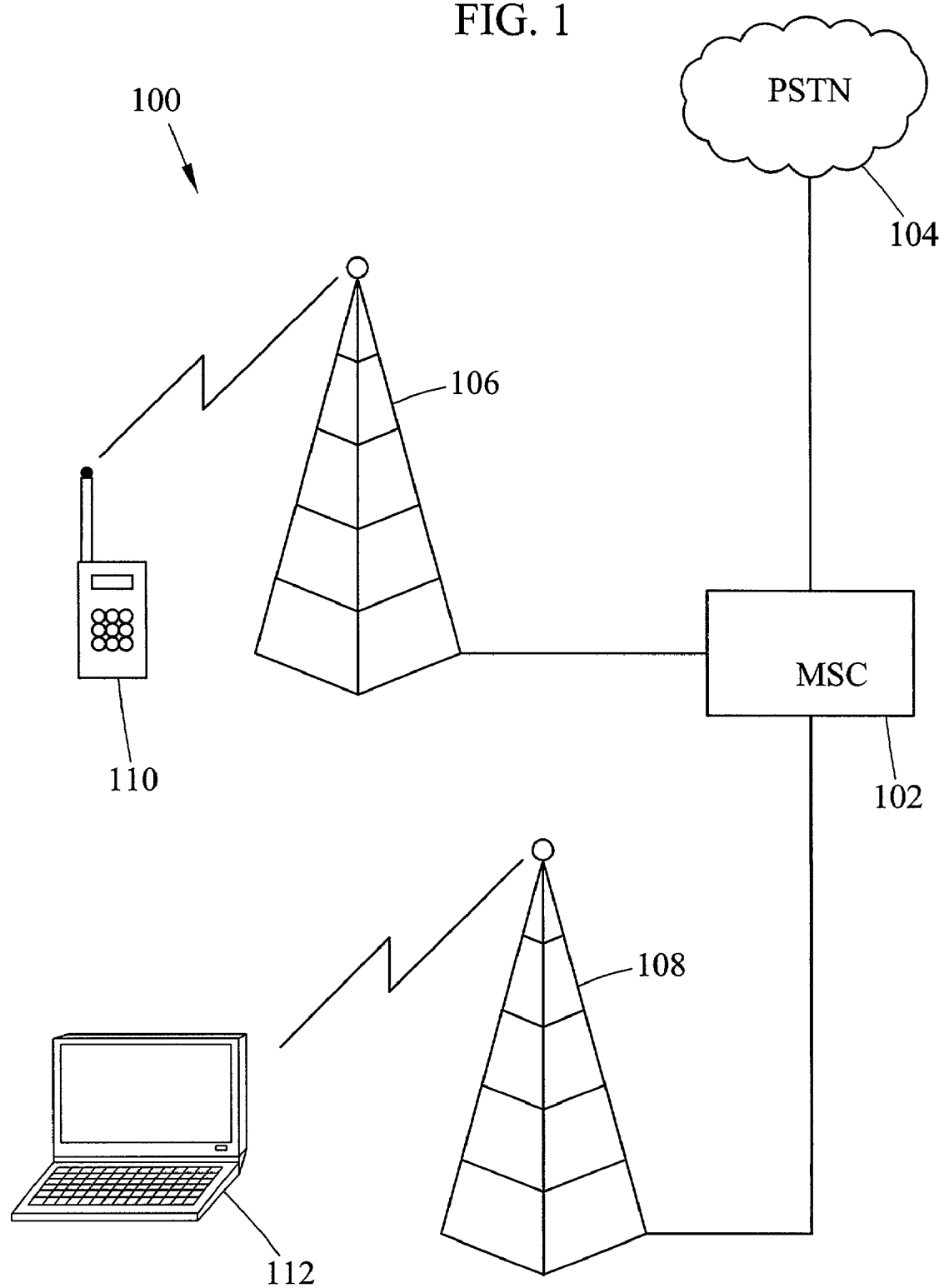
FIG. 1 is schematic view of an exemplary communication system including a mobile switching center operably connected via a landline connection to public switched telephone network.

Referring to FIG. 1, an exemplary communication system 100 is illustrated including a mobile switching center (MSC) 102 operably connected via a landline connection to public switched telephone network (PSTN) 104. MSC 102 may also be directly coupled to an Integrated Services Digital Network (ISDN) and/or Packet Data Network (PDN). Other MSCs (not shown) may be connected to each other and to PSTN 104 at various points (also not shown) according to desired design parameters.

MSC 102 is typically connected to a number of base stations 106 and 108 which serve to connect mobile stations 110 and 112 to the communication system 100. Each base station 106 and 108 is located at the center of its cell, as described above. Base stations consist of a processor and transmitter/receiver connected to an antenna for establishing a communication link with a mobile station. In the illustrated example, base station 106 has a communication link established with a mobile telephone 110. Base station 108 has a communication link established with a mobile computer 112. Mobile stations, such as mobile telephones or computers, each have a processor and a transmitter/receiver connected to an antenna for establishing a communication link with a base station. One or more base stations may be connected to MSC 102. MSC 102 connects each base station 106 and 108 to PSTN 104 and serves to communicate messages between the base stations and the PSTN using a packet switched network.

Figure 2:
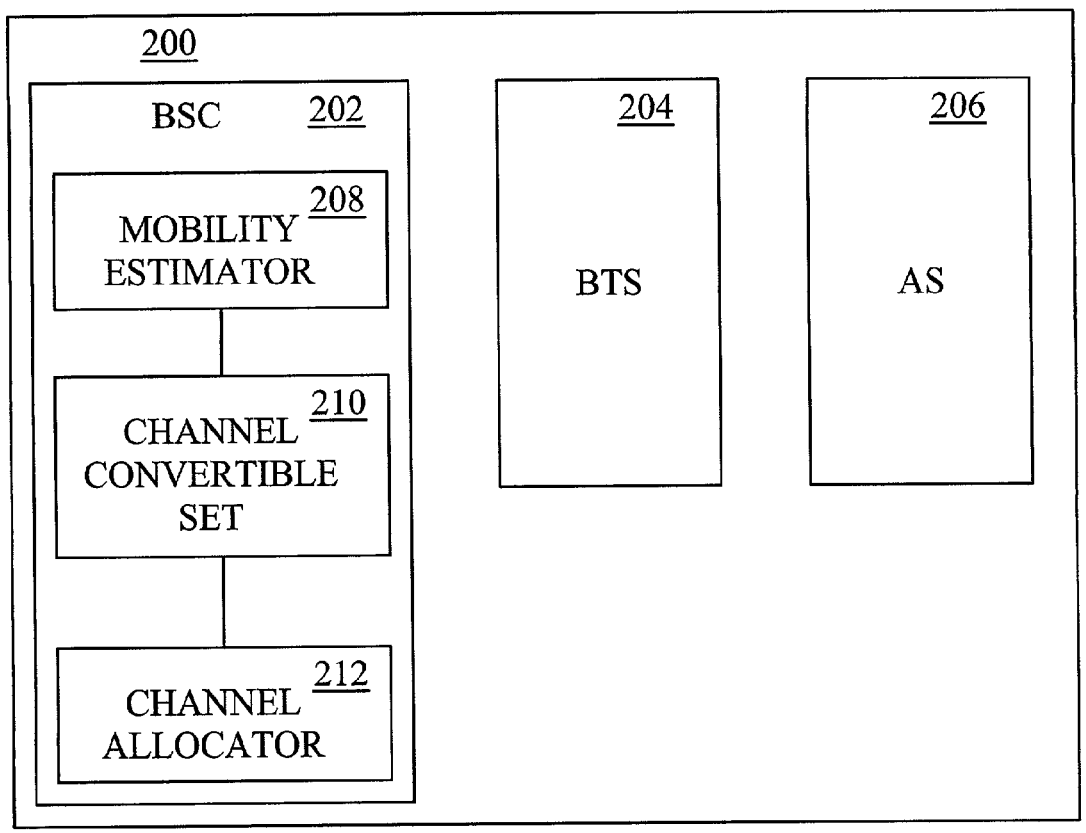
FIG. 2 is a schematic view of a base station according to an embodiment of the present invention.

FIG. 2 illustrates a schematic view of a base station 200 according to an embodiment of the present invention. Base station 200 includes hardware components for transmitting/receiving, managing communication between mobile stations and the PSTN or other network with which a mobile station is communicating, and managing mobility of mobile stations. Mobility management includes handoff management. In the illustrated example, base station 200 includes a base station controller (BSC) 202, a base transceiver station (BTS) 204, and antenna system (AS) 206. Base station controller 202 manages the communication link between the network and mobile stations and the operation of base transceiver station 204 and antenna system 206. Base transceiver station 204 controls the functioning of antenna system 206, which receives and transmits signals to mobile stations.

According to the present invention, base station controller 202 may include a mobility estimator 208 for estimating the mobility of mobile stations requesting handoff cells, a channel convertible set manager 210 for creating a set of convertible communication channels corresponding to channels for unnecessary handoff calls, such as handoff calls when a mobile station is moving away from or stationary with regard to base station 200, and a channel allocator 212 for allocating channels from the channel convertible set and free channels. The functions of components 208, 210, and 212 in identifying unnecessary handoff calls and allocating channels will be described in further detail below.

Figure 3:
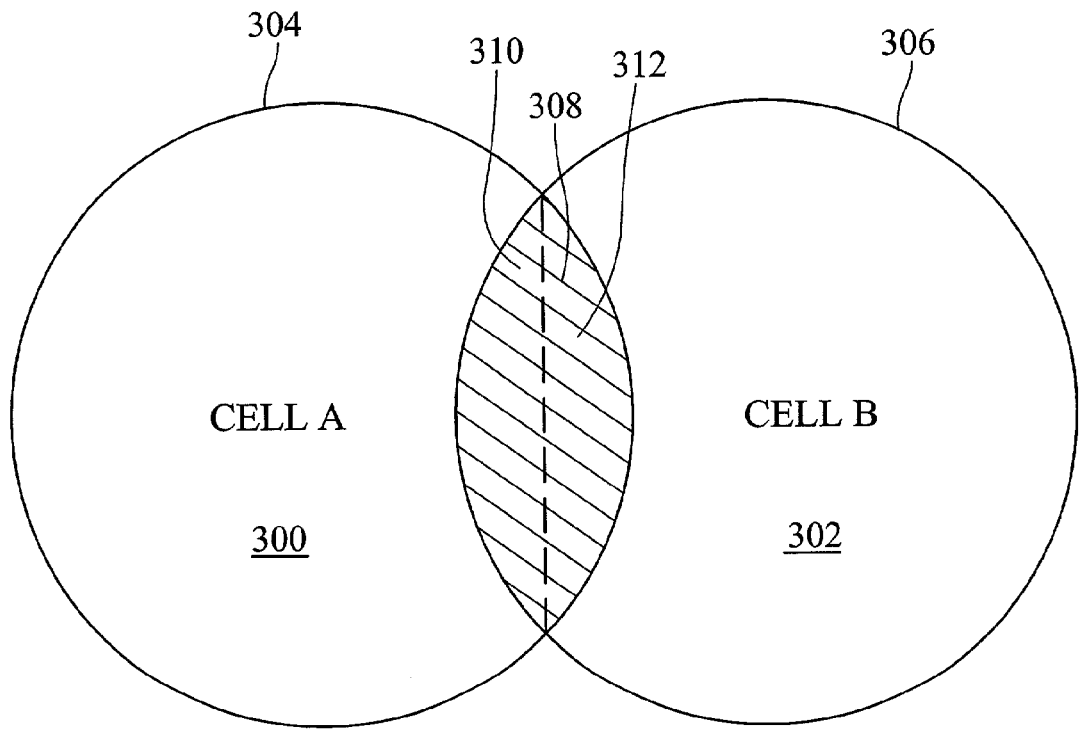
FIG. 3 is schematic view of the cellular geometry of two cells A and B.

Base stations periodically request that mobile stations in the handoff area transmit pilot signal strength messages based on pilot signal strength measured by the mobile stations. Cells are defined by measuring the pilot signal strength. Referring to FIG. 3, an illustration is provided of the cellular geometry of two cells A and B. Mobile stations located in cell A are provided coverage by a target base station 300 located within cell A. A neighbor base station 302 provides coverage to mobile stations located within cell B. The geographic area covered by cells A and B are enclosed within substantially circular areas, designated by reference numerals 304 and 306, respectively. Each cell is defined by an area inside of which the pilot signal strength is greater a predefined threshold $T_{ADD}$.

The cells of adjacent base stations overlap each other in order to provide quality handoff of calls between the base stations associated with each of the cells. In this example, the base stations associated with cells A and B may cover any mobile station in the handoff area, designated shaded area 308, the geographic area at the intersection of the coverage areas of cells A and B. A mobile station is located in the soft handoff area of two cells if the pilot signal strengths from both base stations covering the handoff area are greater than threshold $T_{ADD}$. The normal area for cell A is the coverage area of cell A not enclosed in shaded area 308, the soft handoff area. In one embodiment of the present invention, a mobile station is determined to be located in the normal area of the base station covering cell A when the pilot signal strength from the target base station is greater than threshold $T_{ADD}$ and the pilot signal strengths from all neighboring base stations are less than threshold $T_{DROP}$.

Mobility Estimation

A method for allocating communication channels for handoff in a mobile communication system according to the present invention includes estimating the relative mobility of mobile stations in the handoff area with respect to a base station. Mobility estimation may be performed by mobility estimator 208. The purpose of mobility estimation is to identify unnecessary handoff calls so that communication channels for these calls can be re-allocated, if necessary.

Mobility estimation according to the present invention includes two main steps—identifying the position of handoff calls and evaluating the relative mobility of handoff calls. Identifying the position of handoff calls includes obtaining measured pilot signal strength values from mobile stations and classifying the mobile stations in the appropriate area with the handoff area. Relative mobility of the mobile station is estimated by determining the change in the signal strength between the mobile station and base station over a period of time. The signal strength can be determined by measuring the pilot signal strength transmitted between the mobile station and base station. In one embodiment, the mobile station transmits this information to the base station via the pilot strength measurement message (PSMM), and mobility estimator 208 estimates the relative mobility of the mobile station based on the change in pilot signal strength over time indicated by pilot signal strength measurement messages received from the mobile station. In alternate embodiments, the signal strength can be determined by measuring any signal received at either the base station or mobile station and evaluating the change in signal strength over time. If the signal strength changes over the period of time, mobility estimator 208 determines that the mobile station is moving with respect to the base station. The results from both relative mobility estimation and position information are used in the channel allocation methods according to the present invention.

Relative Mobility Estimation

Relative mobility estimates are based upon the assumption that as signal strength changes, the mobile station is either moving in a direction towards the base station or away from the base station. It is assumed that signal strength decreases as the mobile station moves in a direction away from the associated base station and increases as the mobile station moves in a direction towards the base station. Furthermore, it is assumed that if the signal strength does not change or remains substantially the same over a period of time then the mobile station is stationary with respect to the base station.

In one embodiment of the present invention, mobility estimator 208 may utilize the following exemplary equation to estimate relative mobility provided the signal strength between the mobile station and the base station, wherein ps (t, i) represents the signal strength provided at time t by a signal received from mobile station i, ps (t+Δt, i) represents the signal strength provided at time t+Δt by a signal received from mobile station i, cr_ps (t, i) represents the rate of change of ps (t, i), and Δt represents the time period between a time t and a time t+Δt:

$$cr\_ps(t, i) = \frac{ps(t + \Delta t, i) - ps(t, i)}{\Delta t}$$

If the estimated mobility of the mobile station (i.e., cr_ps (t, i)) is positive, then the mobile station is assumed to be moving towards the base station. Otherwise, if the estimated mobility is negative, the mobile station is assumed to be moving away from the base station.

If the estimated mobility is a zero result, i.e., the strength of the pilot signal is the same value at time t and time t+Δt, the mobile station is assumed to stationary with respect to the base station. In one embodiment of the present invention, if the absolute value of cr_ps (t, i) is less than a predetermined number, the signal strength is considered to remain substantially the same over the time period, and, therefore, the mobile station is considered stationary. The mobile station is considered to be moving when the absolute value of cr_ps (t, i) is above the predetermined number. This predetermined number functions to allow for slight variations in received signal strength that may occur while the mobile station is neither moving in a direction towards nor away from the base station. These mobile stations are considered to be stationary with respect to the base station. Although a mobile station may be moving with respect to the base station, the mobile station is considered stationary if the value of the signal strength remains the same. In one embodiment of the present invention, mobility is estimated for each mobile station in the handoff area.

In an alternate embodiment for estimating relative mobility of handoff calls, mobility estimator 208 may correct pilot signal strength in case of disturbances and fading. In order to account for unexpected factors resulting in inaccurate measurements, multiple pilot signals from multiple base stations may be used for mobility estimation in order to increase reliability of the estimation. In such an embodiment, base stations may communicate measured signal strength values to a centralized mobility estimator, which may be located at the MSC. Alternatively, the mobility estimator at the target base station may receive pilot signal strength measurements destined for or transmitted from mobility estimators of neighboring base stations. In this example, it is assumed that pilot signal strength measurements received by a target base station and a neighboring base station are received by a mobility estimator at the target base station.

Relative mobility is determined for each mobile station in the handoff area of the target cell. The base stations of the target cell and the neighboring cell each receive a message indicating pilot signal strength of each mobile station in the handoff area of the two cells. A number of signal strength measurements are received over a period of time. The signal strength measurements for target and neighbor base stations are averaged. These averages are used to determine the rate of change of the pilot signal strength over a period of time for the target and neighbor base stations. If the absolute value of the average rate of change of the pilot signal strength of a particular mobile station for both the target and neighbor base stations are less than a predetermined number, the mobile station is considered stationary. Otherwise, the mobile station is considered moving in a direction away from the target base station or towards the target base station. The mobility of the mobile station is considered to moving in a direction towards the target base station if the average change rate of the target base station is a negative value and the average change rate of the neighbor base station is a positive value. Otherwise, the mobility of the mobile station is considered to be moving in a direction away from the target base station.

Position Estimation

Figure 4:
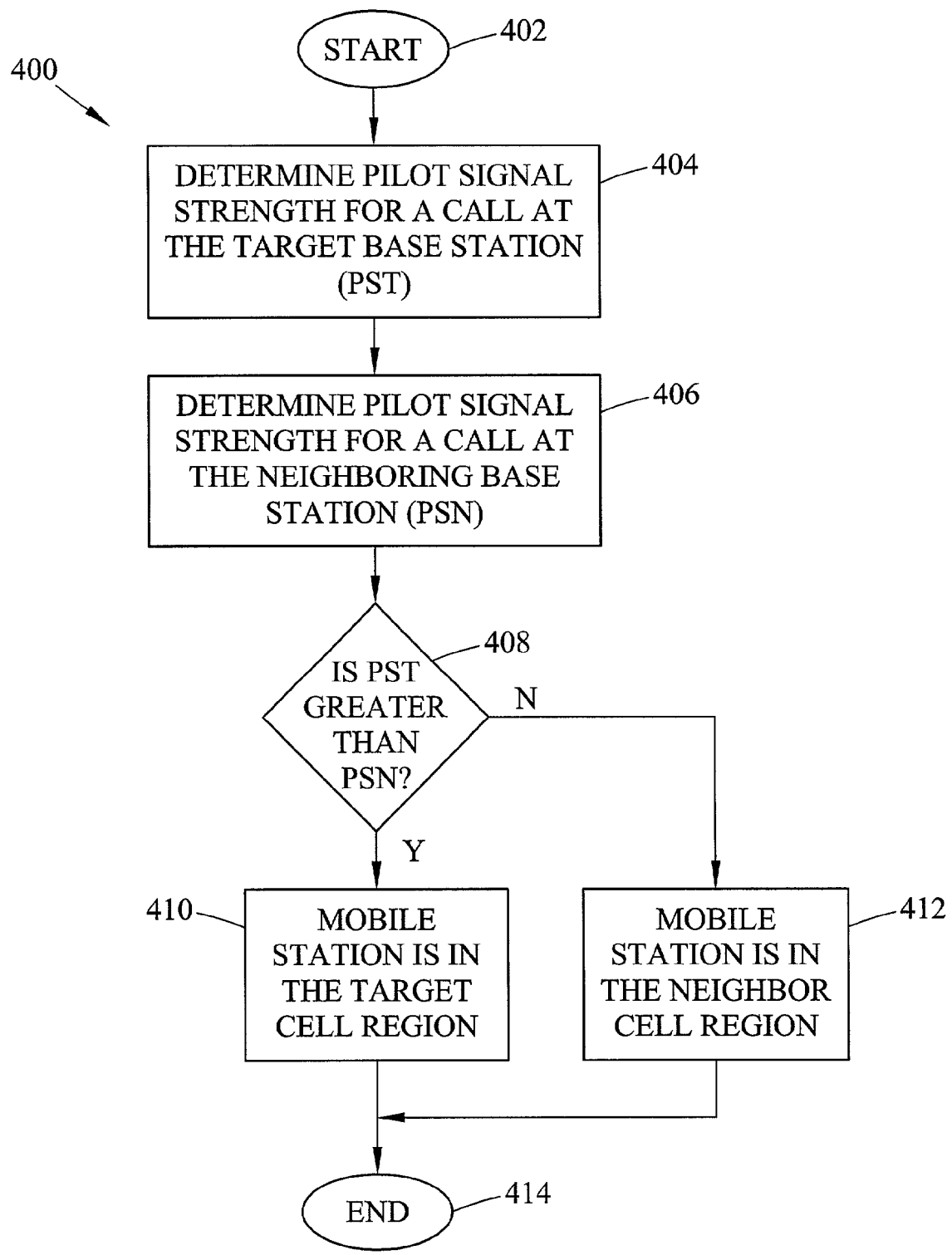
FIG. 4 is a flow chart illustrating a process for position estimation for a mobile station located in the handoff area for one embodiment of the present invention.

Referring now to FIG. 4, a flow chart 400 is provided which illustrates a process for position estimation for a mobile station located in the handoff area for one embodiment of the present invention. As stated above, such position estimation may be performed by mobility estimator 208, which may be located at a base station or an MSC. The process begins at the step indicated by reference numeral 402. In step 404, mobility estimator 208 determines the pilot signal strength measured by the mobile station for a communication channel with the target base station. In step 406, mobility estimator 208 determines pilot signal strength measured by the mobile station for a communication channel with the target base station. If the pilot signal strength associated with the target base station is greater than the pilot signal strength associated with the neighbor base station (step 408), the mobile station is considered to be in the target cell control area (step 410). Otherwise, the mobile station is considered to be in neighbor cell control area (step 412). Those calls located in the neighbor cell control area are primarily controlled by the neighbor base station.

In another embodiment for determining position, mobility estimator 208 may correct pilot signal strength to reduce the impact of disturbances and fading on position estimation. This position estimation may be performed by a centralized mobility estimator located at an MSC or by multiple distributed mobility estimators located at individual base stations. In this example, it is assumed that a mobility estimator resides at each base station and that the mobility estimators located at the individual base station intercept and process pilot signal strength measurements destined for other base stations to reduce the effects of fading and other disturbances. Position is determined for each mobile station in the handoff area of the target cell. Mobility estimators 208 of the base stations of the target cell and the neighbor base station each receive a message indicating pilot signal strength of each mobile station in the handoff area of the two cells. A number of signal strength measurements are received over a period of time. Mobility estimator 208 averages the signal strength measurements for each of the target and neighbor base stations. Next, mobility estimator 208 compares the averages for each of the target and neighbor base stations. If the average for the target base station is greater than the neighbor base station, mobility estimator 208 determines the mobile station is in the target cell control area. Otherwise, mobility estimator 208 determines the mobile station is in the neighbor cell control area.

Referring again to FIG. 3, the target cell and neighbor cell control areas are shown generally at reference numerals 310 and 312, respectively. These areas are divided in the illustration by a broken line. However, the division of the two areas (310 and 312) is not necessarily a straight line as it is dependent on a comparison between the pilot signal strengths of the target base station and the neighbor base station.

Alternatively, other methods may be used to estimate the mobility of a mobile station relative to a base station and a mobile station's position in the handoff area. A global positioning system can be implemented in the mobile station in which to inform the base station of its position for position and mobility estimation with respect to one or more base stations. Global positioning systems are described in more detail in *The Global Positioning System*, IEEE Spectrum Magazine, pp. 36–47 (December 1993), the disclosure of which is incorporated herein by reference in its entirety. Other methods for use in estimating mobile station position and mobility with respect to base station include cell sojourn time and fast fading. The method of cell sojourn time is described in detail in *Channel Management in Microcell/Macrocell CellularRadio Systems*, IEEE Trans. Veh. Technol., 5(4) (November 1996), the disclosure of which is incorporated herein by reference in its entirety. Furthermore, the method of fast fading is described in detail in *Velocity Adaptive Handoff Algorithms for Microcellular Systems*, IEEE Trans Veh. Technol., 43(3) (August 1994), the disclosure of which is incorporated herein by reference in its entirety.

Construction of Channel Convertible Set

The results from mobility and position estimation are used to construct a set of communication channels, referred to herein as a channel convertible set (CCS), which are available for allocation to mobile stations requesting handoff. Communication channels are allocated from the CCS when free channels are not available for handoff allocation. In one embodiment of the present invention, CCS is comprised of the set of all active communication channels for all mobile stations in the handoff area, which are located in the neighbor cell control area and are considered either stationary with respect to or moving in a direction away from the target base station.

In one embodiment of the present invention, the CCS is divided into two subsets referred to herein as pseudo handoff calls and non-pseudo handoff calls. A call is defined as either a pseudo handoff call or a non-pseudo handoff call depending on a combination of factors, including relative mobility and position.

One combination of events for which a call is classified as a pseudo handoff call occurs when the target base station accepts a new call originating from a mobile station having a position in the neighbor cell control area of the soft handoff area. Furthermore, the mobile station then requests handoff to the neighboring base station, and the mobile station's mobility is estimated to be moving in a direction away from the target base station. This combination comprises approximately 25% of the new calls in the soft handoff area.

Another combination of events for which a call is classified as a pseudo handoff call occurs when the target base station accepts a new call originating from a mobile station having a position in the neighbor cell control area of the soft handoff area. Furthermore, the mobile station then requests handoff to the neighboring base station, and the mobile station's mobility is estimated to be stationary with respect to the target base station. In dense urban areas having a CDMA system, the number of mobile stations considered stationary and having a call is approximately 40–50% of the total number of mobile station calls.

A combination of events for which calls are classified as non-pseudo, soft handoff calls occurs when the target base station is engaged in a call with a mobile station with a position that changes from the target cell control area to the neighbor cell control area during a call and the mobile station continues to move in a direction towards the neighbor cell. In this case, the control of the mobile station's call has changed from the target base station to the neighbor base station.

Figure 5:
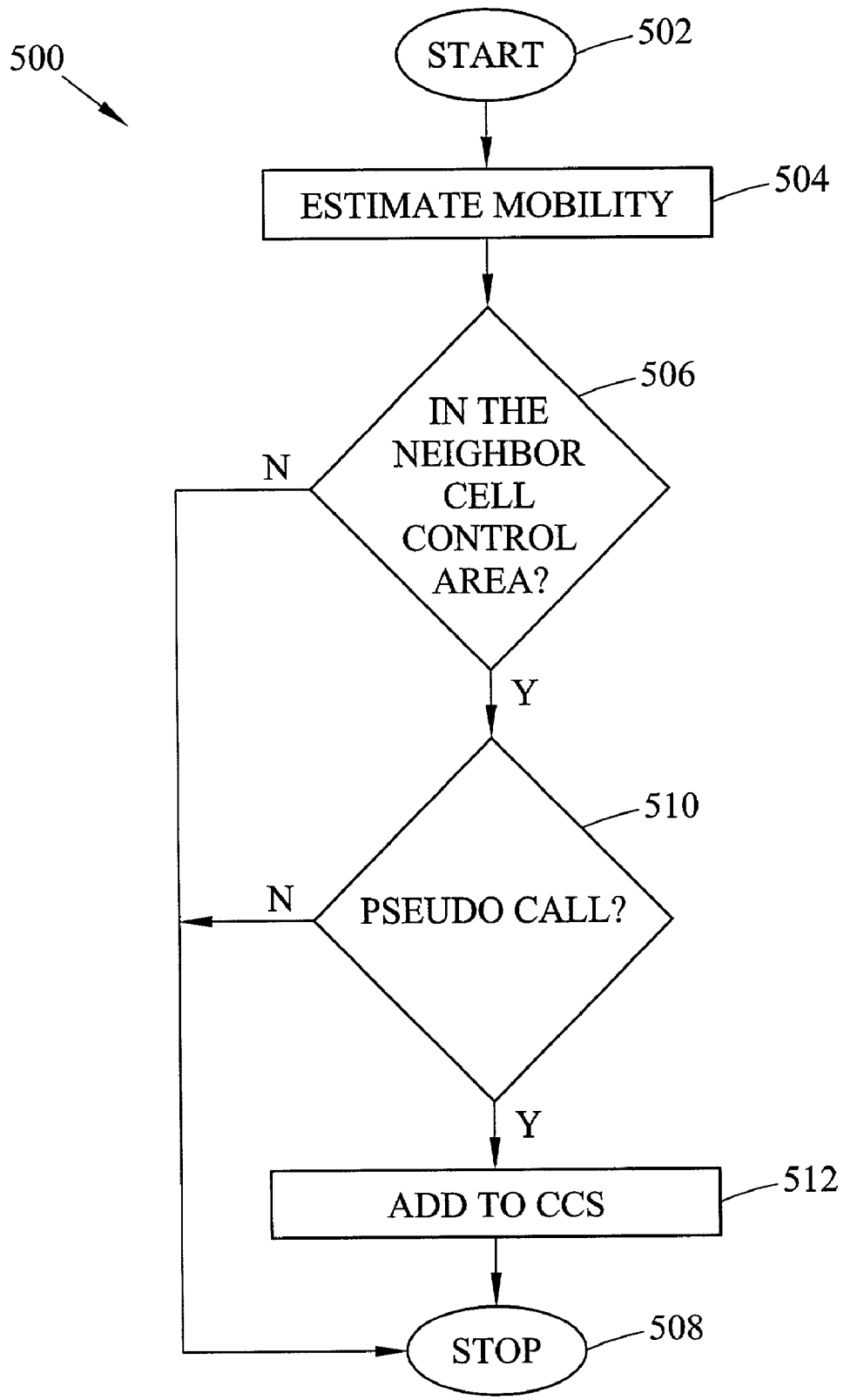
FIG. 5 is a flow chart illustration of an exemplary process of the present invention for the construction of the channel convertible set.

Referring to FIG. 5, a flow chart 500 is provided to illustrate an exemplary process of the present invention for the construction of the channel convertible set. The process steps illustrated in FIG. 5 relating to CCS construction can be performed by channel convertible set manager 210, which may be located at each base station or at an MSC that communicates with each base station. This process occurs for each call of a mobile station located in the handoff area of a target base station. The process begins at start step 502. In step 504, mobility estimator 208 estimates and communicates the mobility estimate to channel convertible set manager 210. Next, channel convertible set manager 210 determines whether the mobile station is located in the neighbor cell control area (step 506). If the mobile station is not located in the neighbor cell control area, channel convertible set manager 210 does not add the communication channel to the CCS and the process stops (step 508). Otherwise, if the mobile station is located in the neighbor cell control area, channel convertible set manager 210 determines whether a call involving the mobile station is a pseudo call (step 510). If the call is not a pseudo call, the communication channel is not added to the CCS and the process stops (step 512). Otherwise, if the call is a pseudo call, the communication channel is added to the CCS (step 510). Then the process stops (step 508).

Figure 6:
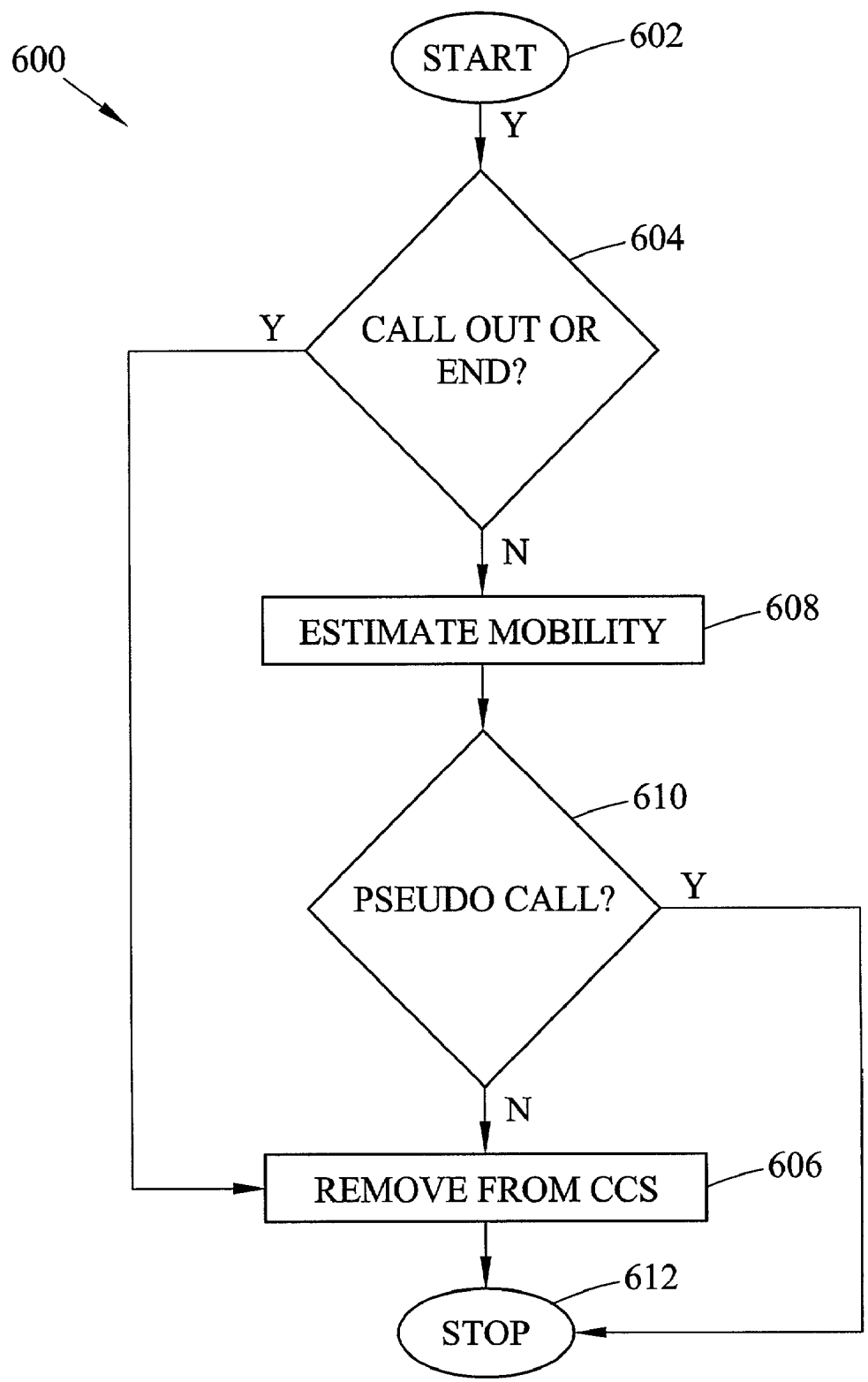
FIG. 6 is a flow chart illustrating an exemplary process of the present invention for removing mobile stations from the channel convertible set.

Referring now to FIG. 6, a flow chart 600 is provided to illustrate an exemplary process of the present invention for removing communication channels from the channel convertible set. The steps illustrated in FIG. 6 may be performed by channel convertible set manager 210 illustrated in FIG. 2. This process occurs periodically for each call of the CCS for the target base station. The process 600 beings at the start step 602. In step 604, channel convertible set manager 210 determines whether the call is out of the neighbor cell control area or the call has ended. If the call is out of the neighbor cell control area or the call has ended, the mobile station is removed from the CCS (step 606). Otherwise, mobility is estimated (step 608), and channel convertible set manager 210 determines whether the call is a pseudo handoff call (step 610). If the call is a pseudo handoff call, channel convertible set manager 210 preferably leaves the communication channel in the CCS and the process stops (step 612). Otherwise, if the call is not a pseudo handoff call, channel convertible set manager 210 may remove the communication channel from the CCS (step 606). Then, the process stops (step 612).

In alternate embodiments, the CCS may be comprised of communication channels associated with an active mobile station located in the soft handoff area from any combination of mobile cell location in the target cell control area, the neighbor cell control area, or where the mobile station moving from one control area to another. Furthermore, the CCS may be comprised of communication channels associated with an active mobile station moving in any direction with respect to the base station.

Channel Allocation Using CCS

Figure 7:
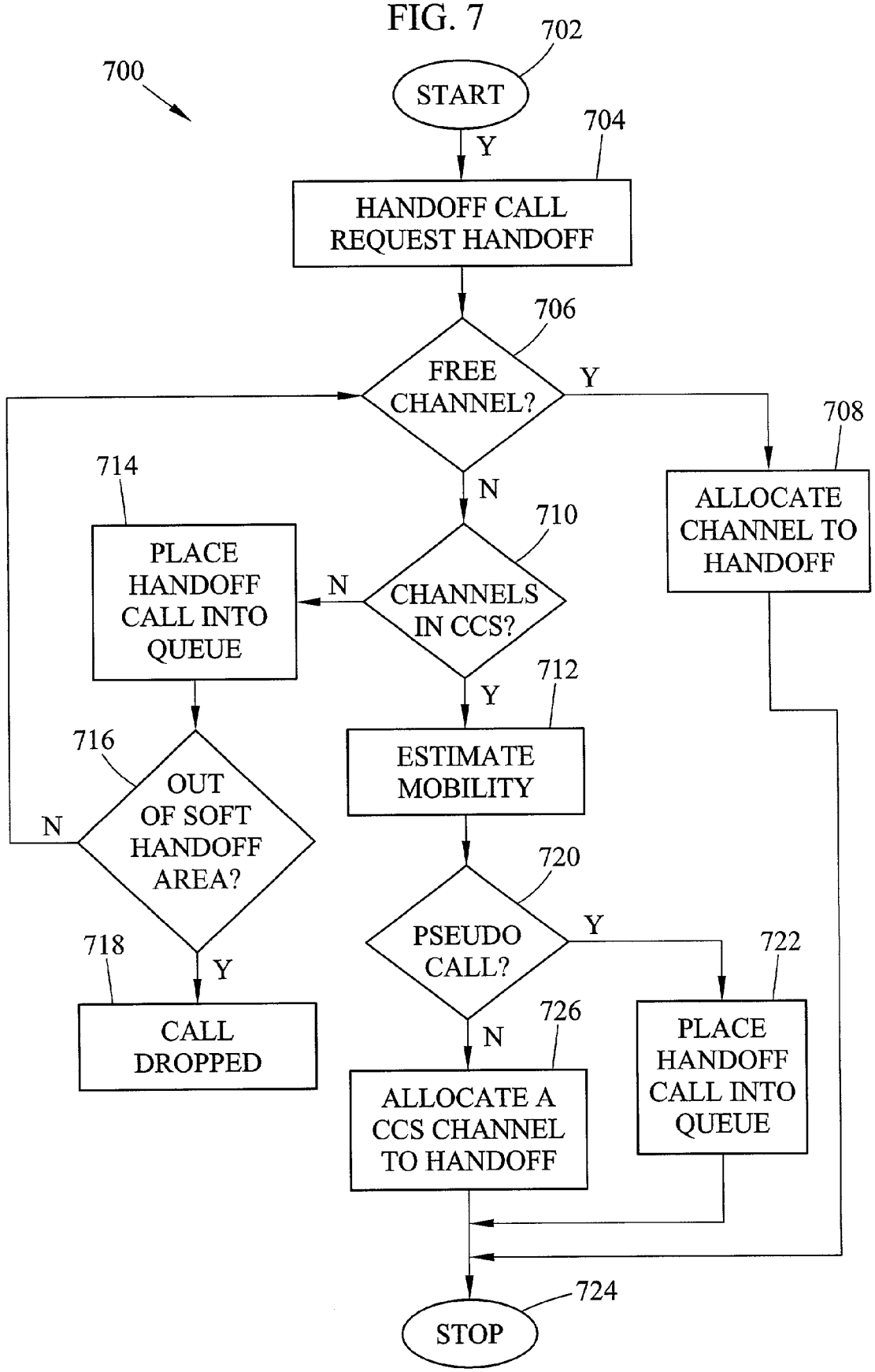
FIG. 7 is a flow chart illustrating an exemplary process of the present invention for handoff.

Once the CCS is constructed, communication channels in the CCS can be allocated for handoff calls, thereby improving utilization efficiency of traffic channels in the system. Referring to FIG. 7, a flow chart 700 is provided to illustrate an exemplary process of the present invention for handoff. The steps illustrated in FIG. 7 may be performed by channel allocator 212 illustrated in FIG. 2. The process starts at step 702. In step 704, channel allocator 212 receives a request for handoff from a mobile station located in the handoff area. In step 706, channel allocator 212 determines whether a free channel is available for allocation. If a free channel is available, channel allocator 212 allocates a free channel to the mobile station requesting handoff (step 708). If a free channel is not available and the new call is not considered a pseudo handoff call, channel allocator 212 determines whether there are channels available in the CCS (step 710). If channels are available in CCS, channel allocator 212 converts the non-controlling channel of a call in CCS the new handoff request beginning at the step indicated by reference numeral 712 (described in more detail hereinafter). The non-controlling channel identifies a channel from one base station in the active set of a mobile station wherein the pilot signal strength is weaker than the strength from the other base stations in the active set.

If channels are not available in CCS, channel allocator 212 places the new handoff call in a queue to wait for an available free channel or CCS channel (step 714). There will be no handoff until a channel is available. The call request will be remain in the queue until the associated mobile station moves out of the handoff area (step 716). If channel allocator 212 determines that the call is moves out of the handoff area without receiving a channel from the base station, the call request will be dropped (step 718). Otherwise, when the call is accepted, the process returns to the step designated at reference numeral 706.

Returning to step 712, mobility is estimated as described hereinbefore. Next, channel allocator 212 determines whether the call for which handoff is being requested handoff is considered a pseudo handoff call by the neighbor base station (step 720). If the call is a pseudo handoff call, channel allocator 212 places the call request in a queue to wait for an available free channel, or CCS channel (step 722). Then the process ends (step 724). Otherwise, if the call is a pseudo handoff call, channel allocator 212 allocates a non-controlling channel in CCS to the new handoff call request (step 726). After step 726, the process ends (step 724).

Reduction of Soft Guard Channels

Figure 8:
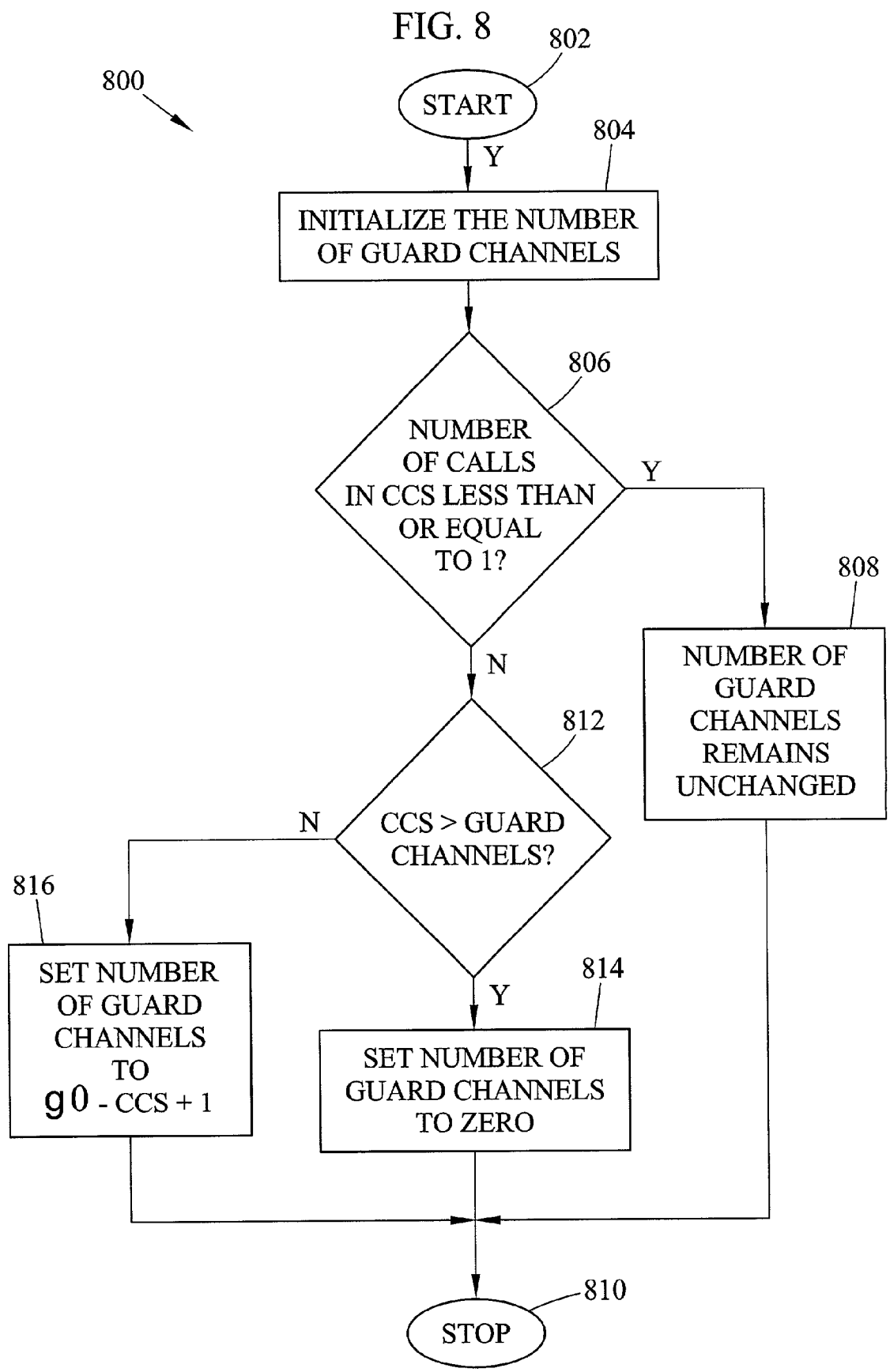
FIG. 8 is a schematic view illustrating a process according to the present invention for dynamically adjusting the number of soft guard channels.

In one embodiment of the present invention, the number of soft guard channels for handoff is adjusted according to the number of channels in the CCS. As discussed above, soft guard channels are channels that a base station reserves for handoff calls. Referring to FIG. 8, a flow chart is provided illustrating a process 800 according to the present invention for dynamically adjusting the number of soft guard channels. The steps illustrated in FIG. 8 for reducing the number of soft guard channels may be performed by channel allocator 212 illustrated in FIG. 2. The process begins at step 802. In step 804, channel allocator 212 sets the number of soft guard channels to a predetermined initial value. Next, in step 806, channel allocator 212 determines whether the number of calls in CCS is less than or equal to one. If the number of calls in CCS is less than or equal to one, number of soft guard channels remains unchanged (step 808) and the process ends (step 810). Otherwise, channel allocator 212 determines whether the number of calls in CCS is greater than the number of soft guard channels (step 812). If the number of channels in CCS is greater than the number of soft guard channels, channel allocator 212 sets the number of soft guard channels (step 814) and the process ends (step 810). If the number of channels in the CCS is greater than the number of soft guard channels, this indicates that there are enough channels in the CCS available for new handoff calls, thus allowing the number of soft guard channels to be set to zero. Otherwise, the number of soft guard channels is set to a number g determined by the following equation (step 816), wherein g0 is the set number of soft guard channels and CCS is the number of CCS: g=g0−CCS+1. Next, the process ends (step 810). This process avoids unnecessary soft guard channel assignment when adequate channel resources are available in the CCS for handoff requirement. In one embodiment of the present invention, this process 800 is run periodically or continuously in order to responsively adjust the number of soft guard channels to the number of channels in the CCS.

When channel conversion is performed, it is important not to influence the quality of data transmission and increase the total interference. Since selection diversity is used for uplink interference in CDMA systems wherein one controlling base station that has a higher receiving power than another base station demodulates the received signal, the transmitting power of the mobile station will remain almost the same. In the present invention, the channel is converted from the non-controlling base station to the handoff request without significantly degrading voice quality or the handoff process, and without increasing interference when the channel conversion is in progress.

Figure 9:
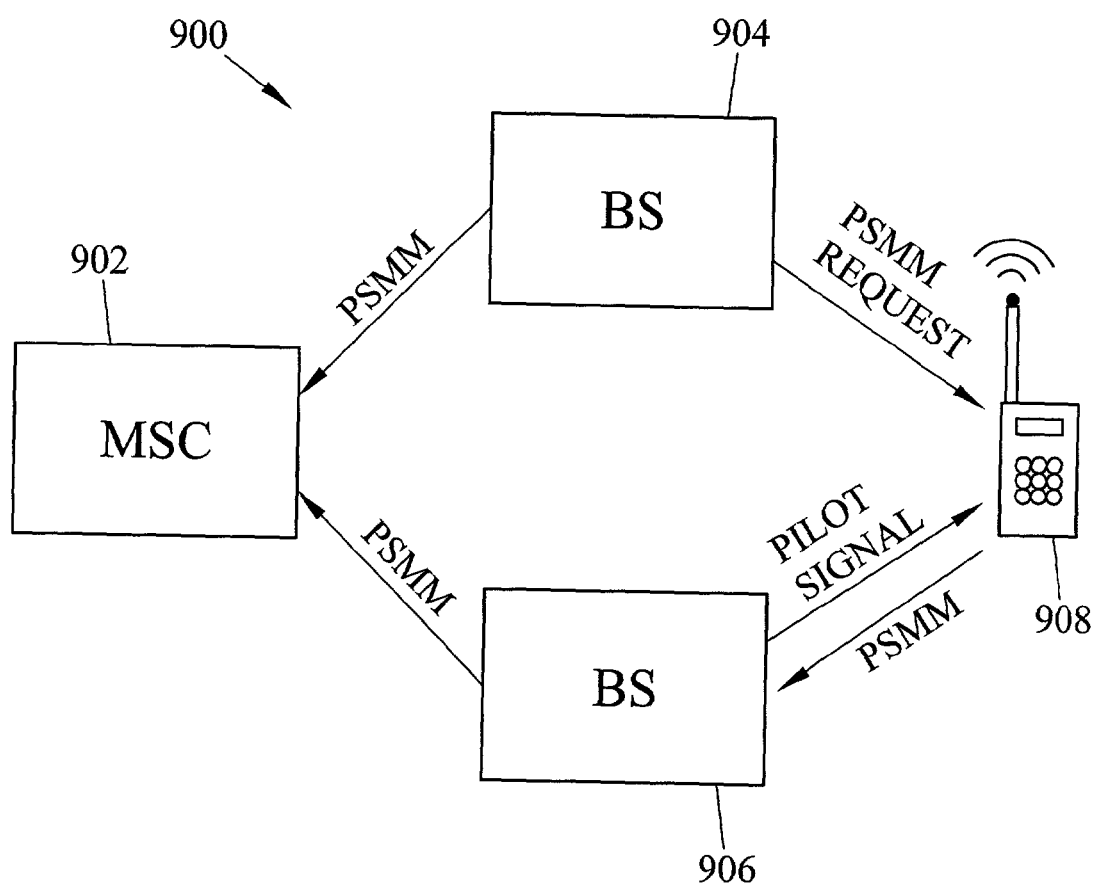
FIG. 9 is a schematic view of an IS-95 CDMA system operating in accord with the present invention.

In one embodiment, the methods of this system can be implemented in an IS-95 CDMA system as described in *Cellular System Remote Unit-Base Station Compatibility Standard of the Electronic Industry Association/Telecommunication Industry Association Interim Standard 95A* (IS-95A), the disclosure of which is incorporated herein by reference in its entirety. Referring to FIG. 9, an illustration is provided of an IS-95 CDMA system 900 is provided operating in accord with the present invention. The CDMA system 900 includes an MSC 902, two base stations 904 and 906, and a mobile station 908. No hardware changes are necessary in the relevant system components to perform the new scheme. However, some software updates are made to MSC 902 and mobile station 908. According to the present embodiment, the software change has two main parts—a pilot strength measurement protocol and a new software component in MSC 902.

First, the pilot strength measurement protocol must be introduced in the CDMA system 900. In known CDMA systems, the pilot signal strength is reported to the base station through the pilot signal strength measurement message. However, this message is transmitted by the mobile station in only two situations—when pilot signal strength exceeds threshold $T_{ADD}$ or drops below threshold $T_{DROP}$. This infrequent report of the received pilot signal strength is not sufficient for the MSC to estimate the relative mobility in a desirable resolution. The mobile station must transmit pilot strength measurement message (PSMM) more frequently for all the pilots in the active set to the appropriate base station. In this embodiment of the present invention, base station 904 solves this problem by periodically transmitting a PSMM request message through a downlink paging channel. Upon receiving the PSMM request message, mobile station 908 transmits a PSMM to base station 904 through an uplink access channel. Base stations 904 and 906 forward pilot signal strength information to MSC 902. Paging and access channels are control channels.

In the second main part, the new software component in MSC 902 performs further processing with the collected pilot signal strength information. The three major computation tasks have been discussed above. In the first major computation task, MSC 902 estimates relative mobility from the PSMM retrieved by the multiple base stations. When the pilot signal strength measurements of multiple base stations give contradictive mobility information, the relative mobility estimation is not used in either CCS construction or channel conversion. Pilot signal strength measurements may contradict each other due to severe fading in one or more base stations. In this situation, the handoff is regarded as a real handoff call and will not be included in the CCS, thereby avoiding potential performance degradation due to false relative mobility estimation. CCS construction and channel conversion may also be implemented as software components residing in MSC 902. Alternatively, as discussed above, these components and the mobility estimation component may be implemented in base stations 904 and 906.

Benefits of the Present Invention

An analytic model has been constructed using stochastic reward net (SRN) in order to evaluate the benefits of the allocation methods and systems of the present invention in CDMA cellular systems. In this analytic model a number of assumptions have been made. Provided that the neighboring cells are statistically identical and operate independently, the characteristics of the communication system can be captured by focusing on a single cell. In this model, a maximum of two different sources in diversity reception is considered. Each cell will reserve a number g soft handoff channels out of a total number $T_d$ of communication channels exclusively available for handoff calls. Every handoff requirement is assumed to be perfectly detected in the present model. The allocation of each communication channel is assumed to be instantaneous provided that a communication channel is available. The maximum allowable queue length is a number $l_e$.

Calls initiated within the cell are assumed to arrive at a Poisson process with rate $\lambda_n$, handoff request arrivals also form Poisson process with rate $\lambda_h$, and the channel holding time $T_c$ follows exponential distribution with mean $\mu_c^{-1}$. By the assumption that the location of a newly generated call is uniformly distributed over a cell, the new call arrival rates in the normal and handoff areas are given by the following equation: $\lambda_n^c = (1-a) \lambda_n$ and $\lambda_n^s = a \lambda_n/2$, where a is the ratio of the handoff area to the entire cell area. Here new calls in the target cell control area of the target cell are considered as new calls in the handoff area from the viewpoint of the target cell. The new calls in the neighbor cell control area of the target cell are taken as handoff calls to the target cell. The dwelling times of a call in two distinct areas are assumed to be exponentially distributed. The transferring rate of a call from the normal area to the handoff area is $\lambda_c^d$. Additionally, the transferring rate of a call from the handoff area to the normal area is $\lambda_c^a$. The rate that a call is terminated is denoted as $\lambda_t$, the rate that a call moves to an adjacent cell is $\lambda_h^d$, and the rate that a call moves from target cell area group to neighbor cell area group of the target cell is $\lambda_s^c$. These quantities can be evaluated by similar methods as described Y. Ma, J. J. Han, and K. S. Trivedi, *Call Admission Control for Reduced Dropped Calls in Code Division Multiple Access (CDMA) Cellular Systems*, Proc. Of IEEE INFOCOM 2000, Vol. 3, pp. 1481–1490, Tel-Aviv, Israel, Mar. 26–30, 2000 and S. L. Su, J. Y. Chen, and J. H. Huang, *Performance Analysis of Soft Handoff in CDMA Cellular Networks*, IEEE JSAC, 12(8): pp. 1281–1288, 1994, both of which are incorporated herein by reference.

Figure 10:
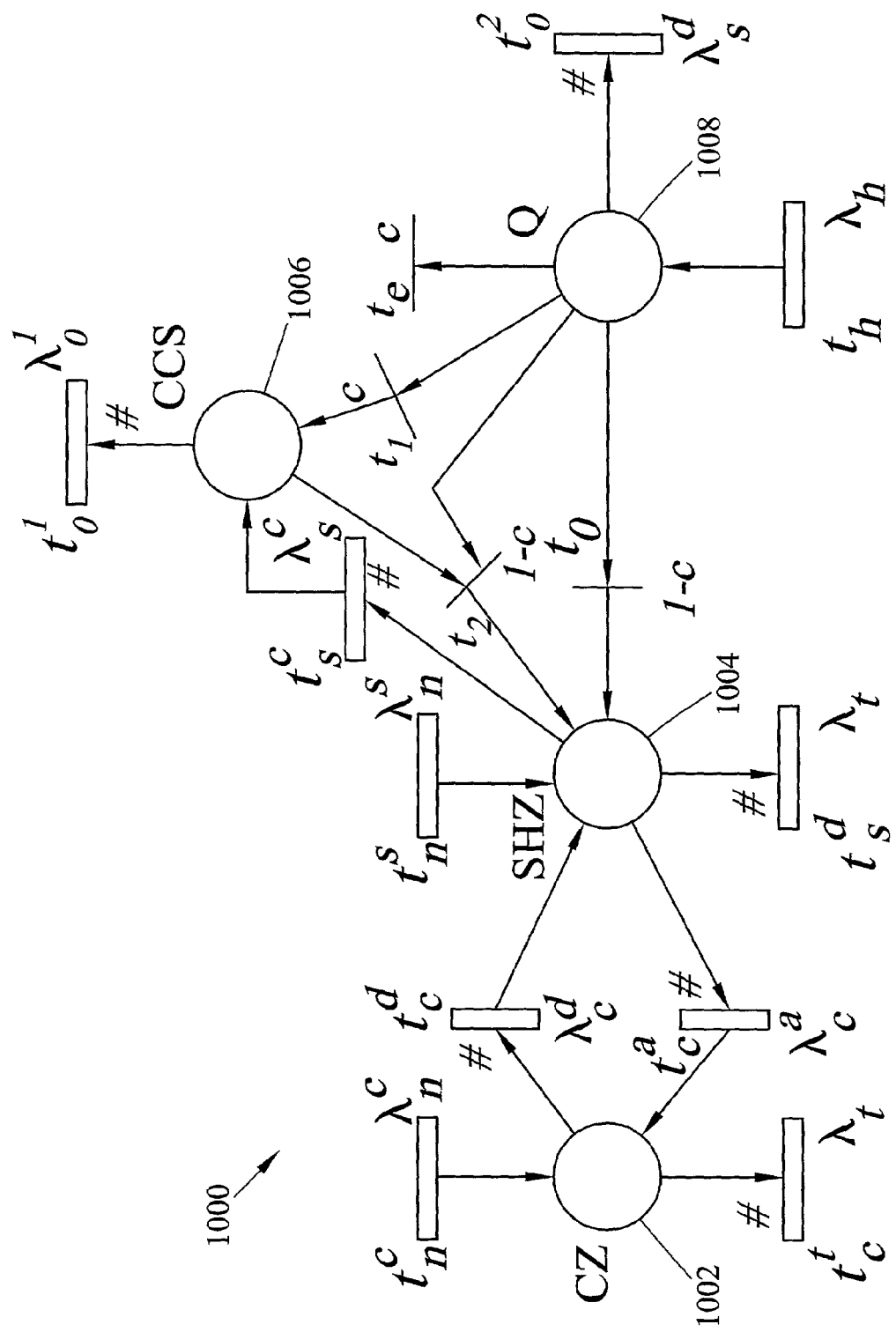
FIG. 10 is a schematic view illustrating an SRN model for the methods and systems of the present invention.

According to the descriptions stated above, a Markovian Stochastic Reward Net (SRN) model is constructed that can be automatically converted to a Markov chain to calculate performance indices. Referring to FIG. 10, a schematic view 1000 is provided illustrating an SRN model for the methods and systems of the present invention. Place CZ 1002 represents the normal area of a generic cell. Place SHZ 1004 represents a set of handoff calls with the CCS. Place CCS 1006 represents the CCS in the handoff area. Place Q 1008 represents the queue for handoff calls. New call arrivals for CZ 1002 and SHZ 1004 are represented by transitions $t_n^c$ and $t_n^s$ respectively. If the current load of the target cell is under the predefined threshold, the new calls are accepted.

Table 1 below summarizes the enabling functions (also called guards) for the SRN model, where (#) represents the number of tokens in a place.

| Transition | Enabling Function |
| --- | --- |
| $t_n^c$, $t_n^s$ | (#CZ) + (#SHZ) + (#CCS) < $T_d$ − g |
| $t_h$ | (#Q) < $I_e$ |
| $t_0$, $t_1$ | (#CZ) + (#SHZ) + (#CCS) < $T_d$ |
| $t_1$, $t_e$ | (#CZ) + (#SHZ) + (#CCS) > = $T_d$ AND (#CZ) + #SHZ < $T_d$ |

The enabling function of a transition determines whether a transition is enabled or not. This is an added condition on top of the explicit input and inhibitor arcs.

With different new call arrival rates, the fixed-point iteration method is employed to determine the handoff arrival rate and the probability c that a handoff call is a pseudo handoff call. The fixed-point iteration method is described in *Sufficient Conditions for the Existence of a Fixed Point in Stochastic Reward Net-Based Iterative* published in IEEE Trans. on Soft. Eng., 22(9), which is herein incorporated by reference. It is noted that a call which enters the handoff area from the normal area of the target cell requests a channel from the neighbor cell, a handoff arrival from the point of view of the neighbor cell. Besides, a new generated call in the target cell area of target cell will become a handoff arrival to the neighbor cell immediately after it gets a channel from the target cell. Therefore, some parameters are calculated as follows:

$$\lambda_h = \Lambda_c^d + \lambda_n^s(1 - P_B);$$

$$c = \frac{\Lambda_n^s}{\Lambda_n^s + \Lambda_c^d}$$

-continued $$g = \begin{cases} g_0 & (\#CCS) = 0, 1 \\ (g_0 - (\#CCS) + 1 & 1 < (\#CCS) < g_0 \\ 0 & (\#CCS) \geq g_0 \end{cases}$$

wherein $\Lambda_c^d$, $\Lambda_n^s$, and $\Lambda_n^c$ denote the throughputs of transitions $t_c^d$, $t_n^s$, and $t_n^c$ respectively. The ratio of pseudo handoff calls to new calls in the handoff area is assumed to be 2 to 3. $P_B$ is the call blocking probability. $g_0$ denotes the predefined number of guard channels.

Figure 11:
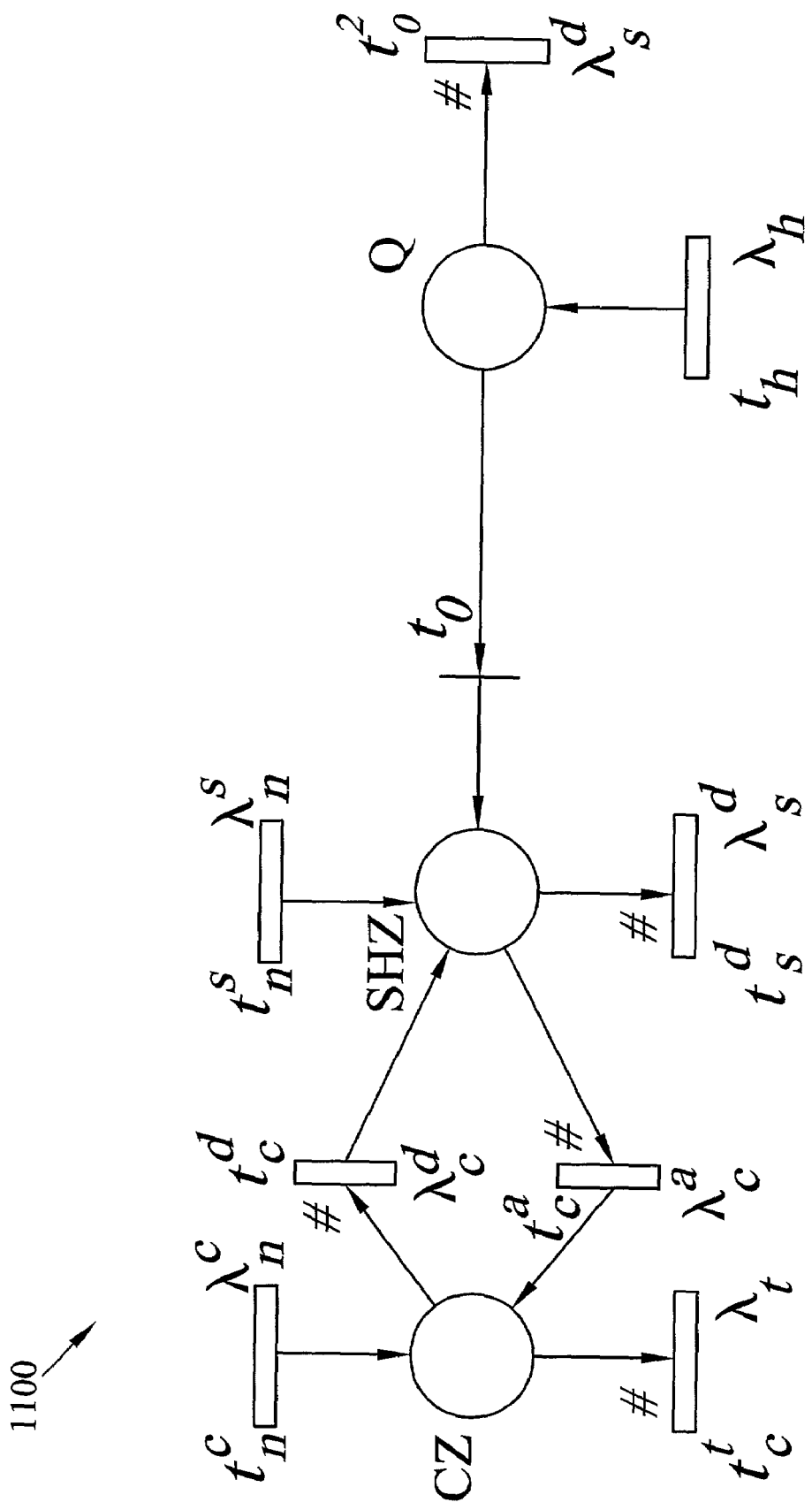
FIG. 11 is a schematic view illustrating an SRN model of a conventional soft handoff scheme for comparison purposes.

Referring to FIG. 11, a schematic view 1100 is provided illustrating an SRN model of a conventional soft handoff scheme for comparison purposes. Since channel conversion and dynamic guard reservation are not deployed in conventional soft handoff scheme, place CCS and corresponding transitions are removed. Beside the rates of $t_s^d$, $t_0^2$ are $\lambda_s^d$ for conventional handoff scheme, but are $\lambda t$ and $\lambda_0^2$ respectively for the methods of the present invention.

The blocking probability from the cell's point of view is denoted as $P_B$, and the blocking probabilities from the system's point of view is denoted as $P_{BS}$. These are calculated as follows:

$$P_B = \sum_{j \in \Omega} r_h^j \pi_j,$$

$$P_{BS} = a \cdot P_B \cdot P_B + (1-a) \cdot P_B,$$

wherein $\Omega$ is the set of tangible markings in the SRN model and $\pi_j$ is the steady state probability of marking j. In the handoff area, if the new call is blocked at one cell, it still has a chance in another cell. That is the reason why $P_B$ is used twice in the above equation for system blocking evaluation. The reward rate assignment $r_h^j$ is given by the following:

$$r_h^j = \begin{cases} 1, & (\#CZ) + (\#SHZ) + (\#CCS) > T_d - g \\ 0, & \text{otherwise} \end{cases}$$

$P_{DS}$ denotes the handoff refused probability for the CCDG and conventional soft handoff from the system's point of view, and is given by:

$$P_{DS} = P_q^f + \frac{\Lambda_0^2}{\Lambda_h}$$

wherein $P_q^f$ is the probability that the queue is full. It is calculated as the steady-state expected reward rate given by the following equation:

$$P_q^f = \sum_{j \in \Omega} r_q^j \pi_j; \quad r_q^j = \begin{cases} 1, & (\#Q) = le \\ 0, & \text{Otherwise} \end{cases}$$

wherein $\Lambda h$, $\Lambda_0^2$ are the throughputs of transitions th and $t_0^2$, respectively.

New call blocking and handoff refused probability versus a range of new call arrival rates has been determined. The following parameters where used: $T_d$=15, a=0.5, $g_0$=2 (channels), $\lambda_t^t$=0.01 (c/s), $\mu dc$=$(T_{dc})^{-1}$=0.03(c/s), and le=4. Other parameters were defined as: $\lambda_c^c$=0.0365854 (c/s); $\lambda_c^a$=0.024 (c/s); $\lambda_h^d$=0.051 (c/s); and $\lambda_s^c$=0.066889 (c/s).

Figure 12:
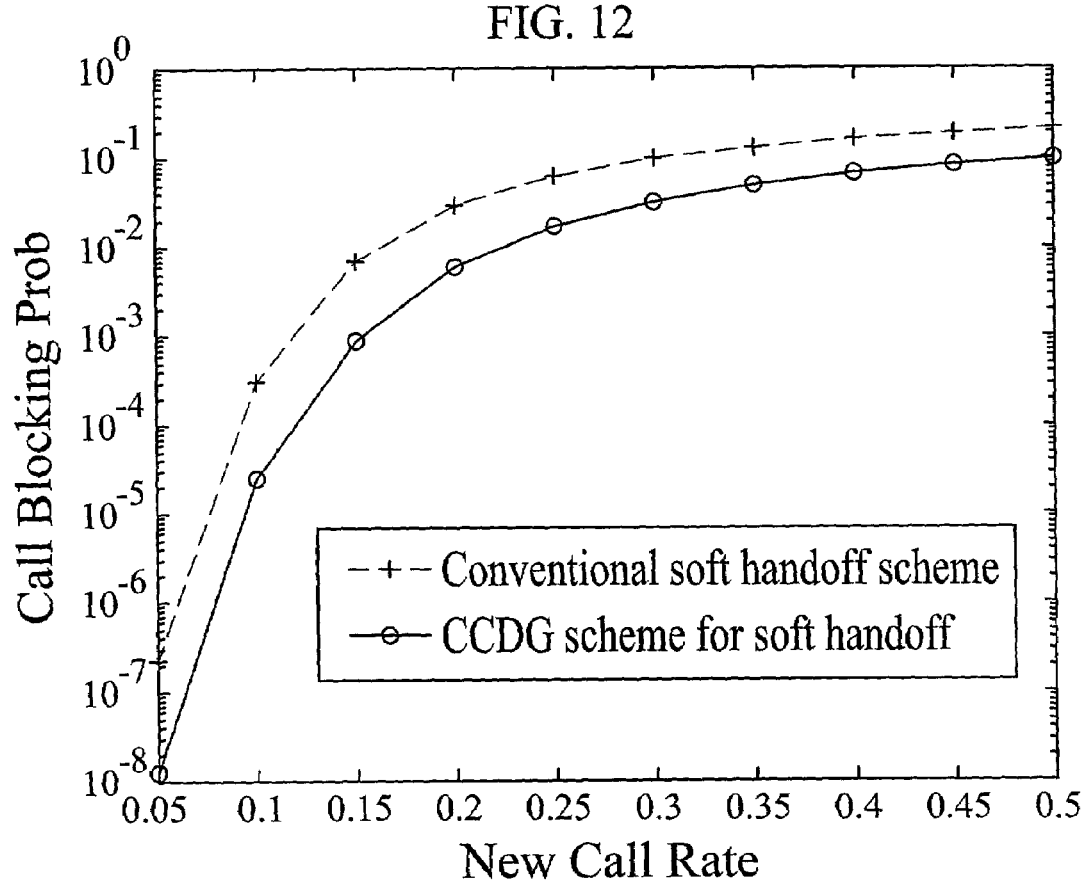
FIG. 12 is a graph illustrating new call blocking probabilities of the conventional soft handoff process as compared to the methods of the present invention.

Referring to FIG. 12, a graph is shown that illustrates the new call blocking probabilities of the conventional soft handoff process as compared to the methods of the present invention. The new call blocking probability scheme of the present invention is about 10 times lower than that of the conventional soft handoff scheme because the CCDG scheme accommodates more handoff calls by channel conversion and gets more channel resources for new call due to dynamic guard channel adjusting.

FIG. 13 is a graph that illustrates the handoff refused probability of the conventional soft handoff scheme as compared to the methods of the present invention. Improvement on handoff refused probability by CCDG handoff scheme is steady (about 2 order of magnitude relative reduction) because the CCDG scheme distinguishes handoff calls in CCS from ordinary handoff calls and services more handoff calls by channel conversion.

Although the present invention has been described with respect to handoff between CDMA cells, the principles of the present invention also can be used for handoff of a mobile station from any other known type cell to any other known type of cell. For example, the method according to the present invention can be used for handoff of a mobile station from a CDMA cellular telecommunications system to a personal communications system (PCS) or to a digital TDMA cellular telecommunications system. Furthermore, it will be understood that various details of the invention may be changed without departing from the scope of the invention. The foregoing description is for the purpose of illustration only, and not for the purpose of limitation—the invention being defined by the claims.

What is claimed is:

1. A method for allocating communication channels for handoff in a first base station having a communication link with active mobile stations located in a handoff area of the first base station and a second base station, the method comprising:
    (a) constructing a channel convertible set including communication channels of the first base station allocated to active mobile stations moving in a direction away from the first base station;
    (b) receiving a handoff request from a requesting mobile station having a communication link with the second base station;
    (c) determining whether a free channel of the first base station not allocated to a mobile station is available for the handoff request; and
    (d) if the free channel is not available for the handoff request, allocating one of the communication channels in the channel convertible set to the handoff request.

2. The method of claim 1 wherein constructing a channel convertible set includes determining whether the active mobile stations are moving in a direction away from the first base station.

3. The method of claim 1 wherein the communication channels in the channel convertible set further includes communication channels for active mobile stations that are stationary with respect to the first base station.

4. The method of claim 3 wherein determining whether the active mobile stations are stationary includes determining whether the signal strength of the communication link between the active mobile stations and second base station are substantially the same over a period of time.

5. The method of claim 3 wherein the communication channels included in the channel convertible set are associated with mobile stations each having a second communication channel with the second base station, wherein the signal strength of the second communication channel is greater than the signal strength of the communication channel with the first base station.

6. The method of claim 1 wherein the communication channels included in the channel convertible set are associated with mobile stations requesting handoff to the second base station.

7. The method of claim 6 wherein the communication channels included in the channel convertible set are associated with mobile stations each having a second communication channel with the second base station, wherein the signal strength of the second communication channel is greater than the signal strength of the communication channel with the first base station.

8. The method of claim 1 wherein the communication channels included in the channel convertible set are associated with mobile stations each having a second communication channel with the second base station, wherein the signal strength of the second communication channel is greater than the signal strength of the communication channel with the first base station.

9. The method of claim 1 wherein a set of communication channels included in the channel convertible set are associated with mobile stations each having a communication channel with the second base station and the mobile stations move from a location wherein the signal strength of the communication channel with the first base station is greater than the communication channel with the second base station to a location wherein the signal strength of the communication channel with the second base station is greater than the communication channel with the first base station.

10. The method of claim 1 wherein the first base station is operable in a Code Division Multiple Access communication system.

11. The method of claim 1 wherein the handoff process is soft handoff.

12. The method of claim 11 wherein the first base station has an initial number of soft guard channels reserved for mobile stations requesting a communication link in the handoff area.

13. The method of claim 12 further comprising:
(a) determining the number of communication channels in the channel convertible set; and
(b) reducing the number of soft guard channels based on the number of communication channels in the channel convertible set.

14. The method of claim 1 wherein allocating one of the communication channels in the channel convertible set includes:
(a) determining whether the requesting mobile station is moving in a direction towards the first base station; and
(b) if the requesting mobile station is moving in a direction towards the first base station, allocating a channel in the channel convertible set to the requesting mobile station.

15. The method of claim 1 wherein allocating one of the communication channels in the channel convertible set includes:
(a) determining whether the requesting mobile station is stationary with respect to the first base station; and
(b) if the requesting mobile station is stationary with respect to the first base station, allocating a channel in the channel convertible set to the requesting mobile station.

16. A method for allocating a communication channel of a first base station from a first mobile station located in a handoff area and having an active communication link with the first base station to a second mobile station requesting handoff, the method comprising:
(a) estimating the mobility of the first mobile station with respect to the first base station;
(b) receiving a handoff request from the second mobile station; and
(c) in response to determining that the first mobile station is moving in a direction away from the first base station and receiving the handoff request from the second mobile station, converting the communication channel from the first mobile station to the second mobile station.

17. The method of claim 16 wherein the communication channel is converted only in response to determining the first mobile station is stationary with respect to the first base station.

18. The method of claim 17 wherein determining the first mobile station is stationary with respect to the first base station includes determining whether the signal strength of the active communication link between the first mobile station and the first base station is substantially the same over a period of time.

19. The method of claim 17 wherein determining whether the first mobile station is stationary includes determining whether the signal strength of the communication link between the first mobile station and a second base station are substantially the same over a period of time.

20. The method of claim 17 wherein determining that the first mobile station is moving in a direction away from the first base station further includes determining whether the first mobile station has a second communication channel with a second base station, wherein the signal strength of the second communication channel is greater than the signal strength of the communication channel with the first base station.

21. The method of claim 16 wherein determining that the first mobile station is moving in a direction away from the first base station further includes determining whether the first mobile station is requesting handoff to a second base station.

22. The method of claim 21 wherein determining that the first mobile station is moving in a direction away from the first base station further includes determining whether the first mobile station has a second communication channel with the second base station, wherein the signal strength of the second communication channel is greater than the signal strength of the communication channel with the first base station.

23. The method of claim 16 wherein determining that the first mobile station is moving in a direction away from the first base station further includes determining whether the first mobile station has a second communication channel with a second base station, wherein the signal strength of the second communication channel is greater than the signal strength of the communication channel with the first base station.

24. The method of claim 16 wherein determining that the first mobile station is moving in a direction away from the first base station further includes determining whether the first mobile station has a communication channel with a second base station and the first mobile station moves from a location where the signal strength of a communication channel with the first base station is greater than the signal strength of a communication channel with a second base station to a location where the signal strength of the communication channel with the second base station is greater than the signal strength of the communication channel with the first base station.

25. The method of claim 16 wherein the first base station is operated in a Code Division Multiple Access communication system.

26. The method of claim 16 wherein converting the communication channel to the second mobile station includes:
   (a) determining whether the second mobile station is moving in a direction towards the first base station; and
   (b) if the second mobile station is moving in a direction towards the first base station, converting the communication channel from the first mobile station to the second mobile station.

27. A method for estimating the mobility of a mobile station with respect to a first base station, the method comprising:
   (a) receiving a signal including an indication of signal strength between the first base station and the mobile station;
   (b) determining whether the signal strength changes over a period of time;
   (c) if the signal strength changes over the period of time, determining that the mobile station is moving in a direction with respect to the first base station;
   (d) determining whether the signal strength increases over a period of time; and
   (e) if the signal strength increases over a period of time, reporting that the mobile station is moving in a direction towards the first base station.

28. The method of claim 27 further comprising:
   (a) receiving a second signal including an indication of signal strength between a second base station and the mobile station;
   (b) determining whether the signal strength between the first base station and the mobile station increases over a period of time;
   (c) determining whether the signal strength between the second base station and the mobile station decreases over a period of time
   (d) if the signal strength between the first base station and the mobile station increases over a period of time and the signal strength between the second base station and the mobile station decreases over a period of time, reporting that the mobile station is moving in a direction towards the first base station.

29. The method of claim 27 further comprising;
   (a) determining whether the signal strength decreases over a period of time; and
   (b) if the signal strength decreases over a period of time, reporting that the mobile station is moving in a direction away from the base station.

30. The method of claim 27 further comprising:
   (a) receiving a second signal including an indication of signal strength between a second base station and the mobile station;
   (b) determining whether the signal strength between the first base station and the mobile station decreases over a period of time;
   (c) determining whether the signal strength between the second base station and the mobile station increases over a period of time;
   (d) if the signal strength between the first base station and the mobile station decreases over a period of time and the signal strength between the second base station and the mobile station increases over a period of time, reporting that the mobile station is moving in a direction away from the first base station.

31. The method of claim 27 further comprising;
   (a) determining whether the signal strength remains substantially the same over a period of time; and
   (b) if the signal strength remains substantially the same over a period of time, reporting that the mobile station is stationary with respect to the base station.

32. The method of claim 27 further comprising:
   (a) receiving a second signal including an indication of signal strength between a second base station and the mobile station;
   (b) determining whether the signal strength between the first base station and the mobile station remains substantially the same over a period of time;
   (c) determining whether the signal strength between the second base station and the mobile station remains substantially the same over a period of time; and
   (d) if the signal strength between the first base station and the mobile station remains substantially the same over a period of time and the signal strength between the second base station and the mobile station remains substantially the same over a period of time, reporting that the mobile station is stationary with respect to the first base station.

33. A system for allocating communication channels in a mobile communications network, the system comprising:
   (a) a mobility estimator for estimating the relative mobility of mobile stations with respect to a base station;
   (b) a channel convertible set manager for generating a channel convertible set including communication channels of the base station for active mobile stations that are determined to be moving away from or stationary with respect to the base station based on mobility estimates generated by the mobility estimator; and
   (c) a channel allocator for receiving requests to the base station for handoff calls and for allocating channels from the channel convertible set for the handoff calls to the base station.

34. The system of claim 33 wherein the mobility estimator estimates the relative mobility of the mobile stations based on pilot strength measurement messages received from the mobile stations.

35. The system of claim 34 wherein the mobility estimator determines that a mobile station is moving away from the base station when the pilot strength measurement messages indicate that pilot signal strength is decreasing over time.

36. The system of claim 34 wherein the mobility estimator determines that a mobile station is stationary with respect to the base station when the pilot strength measurement messages indicate that pilot signal strength remains within a predetermined range within a period of time.

37. The system of claim 33 wherein the channel allocator determines whether free channels are available for handoff calls and, in response to determining that no free channels are available, allocates a channel from the channel convertible set.

38. The system of claim 33 wherein the channel allocator maintains a set of soft guard channels reserved for handoff requests and reduces the number of soft guard channels based on the number of channels in the channel convertible set.

39. The system of claim 33 wherein elements (a)–(c) are located in a base station.

40. The system of claim 33 wherein elements (a)–(c) are located in a mobile switching center.

41. A method for allocating communication channels for handoff in a first base station having a communication link with active mobile stations located in a handoff area of the first base station and a second base station, the method comprising:
(a) constructing a channel convertible set including communication channels for active mobile stations moving in a direction away from the first base station;
(b) receiving a handoff request from a requesting mobile, station having a communication link with the second base station;
(c) determining whether a free channel is available for the handoff request; and
(d) if the free channel is not available for the handoff request, allocating one of the communication channels in the channel convertible set to the handoff request,
wherein constructing a channel convertible set includes determining whether the active mobile stations are moving in a direction away from the first base station, and
wherein determining whether the active mobile stations are moving in a direction away from the first base station includes determining whether the signal strength of the communication link between the active mobile stations and first base station has decreased over a period of time.

42. A method for allocating communication channels for handoff in a first base station having a communication link with active mobile stations located in a handoff area of the first base station and a second base station, the method comprising:
(a) constructing a channel convertible set including communication channels for active mobile stations moving in a direction away from the first base station;
(b) receiving a handoff request from a requesting mobile station having a communication link with the second base station;
(c) determining whether a free channel is available for the handoff request; and
(d) if the free channel is not available for the handoff request, allocating one of the communication channels in the channel convertible set to the handoff request,
wherein constructing a channel convertible set includes determining whether the active mobile stations are moving in a direction away from the first base station, and
wherein determining whether the active mobile stations are moving in a direction away from the first base station includes determining whether the signal strength of the communication link between the active mobile stations and second base station has increased over a period of time.

43. A method for allocating communication channels for handoff in a first base station having a communication link with active mobile stations located in a handoff area of the first base station and a second base station, the method comprising:
(a) constructing a channel convertible set including communication channels for active mobile stations moving in a direction away from the first base station;
(b) receiving a handoff request from a requesting mobile station having a communication link with the second base station;
(c) determining whether a free channel is available for the handoff request; and
(d) if the free channel is not available for the handoff request, allocating one of the communication channels in the channel convertible set to the handoff request,
wherein the communication channels in the channel convertible set further includes communication channels for active mobile stations that are stationary with respect to the first base station, and
wherein constructing the channel convertible set includes determining whether the signal strength of the communication link between the active mobile stations and first base station are substantially the same over a period of time.

44. A method for allocating a communication channel of a first base station from a first mobile station located in a handoff area and having an active communication link with the first base station to a second mobile station requesting handoff, the method comprising:
(a) estimating the mobility of the first mobile station with respect to the first base station;
(b) receiving a handoff request from the second mobile station; and
(c) in response to determining that the first mobile station is moving in a direction away from the first base station, converting the communication channel from the first mobile station to the second mobile station,
wherein determining that the first mobile station is moving in a direction away from the first base station includes determining whether the signal strength of the active communication link between the first mobile station and the base station has decreased over a period of time.

45. The method of claim 44 wherein determining whether the first mobile station is moving in a direction away from the first base station includes determining whether the signal strength of the communication link between the active mobile station and a second base station has increased over a period of time.

46. A system for allocating communication channels in a mobile communications network, the system comprising:
(a) a mobility estimator for estimating the relative mobility of mobile stations with respect to a base station;
(b) a channel convertible set manager for generating a channel convertible set including communication channels for active mobile stations that are determined to be moving away from or stationary with respect to the base station based on mobility estimates generated by the mobility estimator; and
(c) a channel allocator for receiving requests for handoff calls and for allocating channels from the channel convertible set for the handoff calls,
wherein the channel convertible set manager adds communication channels to the channel convertible set based on the mobility estimates.

* * * * *